United States Patent [19]

Cress

[11] Patent Number: 4,920,033

[45] Date of Patent: Apr. 24, 1990

[54] ROTATABLE DISK TEACHING APPARATUS

[76] Inventor: John E. Cress, 2833 Cambridge, Chicago, Ill. 60657

[21] Appl. No.: 150,208

[22] Filed: Jan. 29, 1988

[51] Int. Cl.⁵ .................... G09B 1/22; G09B 23/02
[52] U.S. Cl. ........................ 434/198; 434/215; 434/404; 235/88 M; 235/88 N; 235/78 M; 235/78 N
[58] Field of Search ............... 434/191, 198, 215, 404; 235/88, 78 G, 78 M, 78 N, 88 G, 88 M, 88 N, 123

[56] References Cited

U.S. PATENT DOCUMENTS

| | | | |
|---|---|---|---|
| 22,692 | 11/1945 | Tilbrook | 251/253 |
| 1,161,381 | 11/1915 | Duffy . | |
| 2,512,197 | 6/1950 | Cusano | 235/123 |
| 2,816,373 | 12/1957 | Caddy | 434/404 |
| 2,949,681 | 8/1960 | Knefeli | 434/191 |
| 3,024,540 | 3/1962 | Orth | 434/198 |
| 3,544,768 | 12/1970 | Warner | 235/88 |
| 4,611,113 | 9/1986 | Halstead | 235/78 R |
| 4,634,385 | 1/1987 | Stemper | 434/198 |

Primary Examiner—Edward M. Coven
Assistant Examiner—Valerie Szczepanik
Attorney, Agent, or Firm—Dick and Harris

[57] ABSTRACT

A demonstrative teaching apparatus for teaching the relationship between variable pictorial and/or graphic displays and their respective numerical values, in which the entire apparatus is positioned within an apparatus housing. The apparatus housing incorporates viewing areas on its front and rear sides so as to provide optical display of the relevant teaching portions of the apparatus. The front viewing area reveals the position of the segmented display while the rear viewing area reveals numerical indicia corresponding to the display of segments appearing through the first viewing area. The segmented display and, in turn, its respective numerical indicia, can be increased or decreased by forward or reverse rotation of a circular disk. The circular disk is precluded from excessive rotation in either direction through stopping mechanisms which limit the inadvertent winding or unwinding of the segmented display.

26 Claims, 2 Drawing Sheets

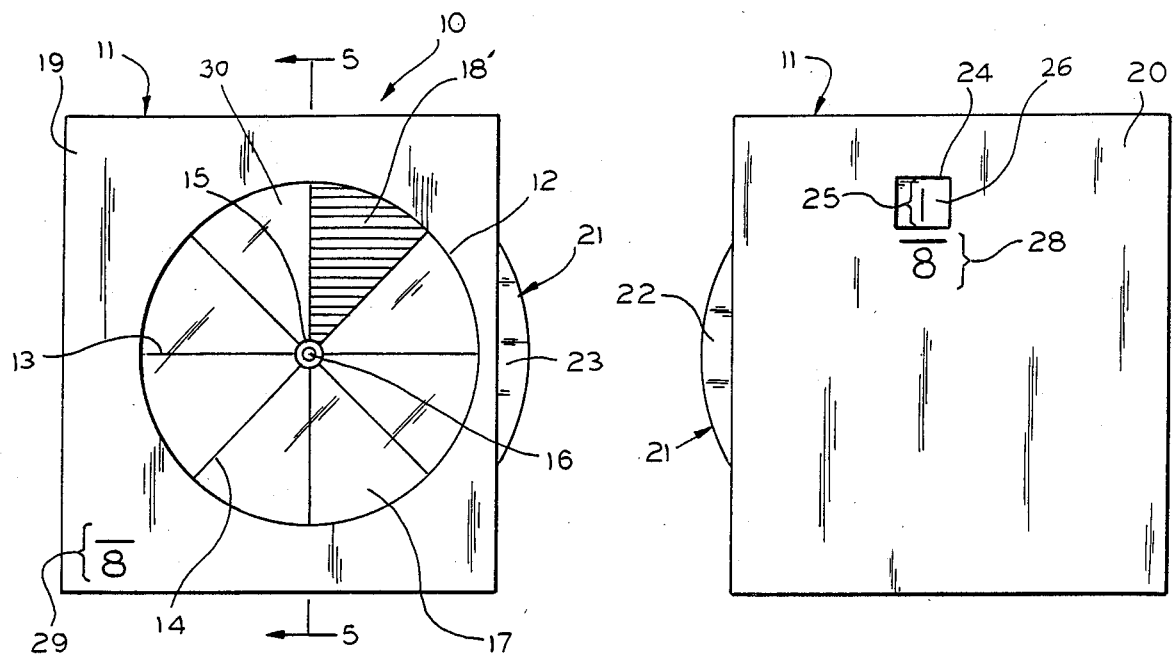
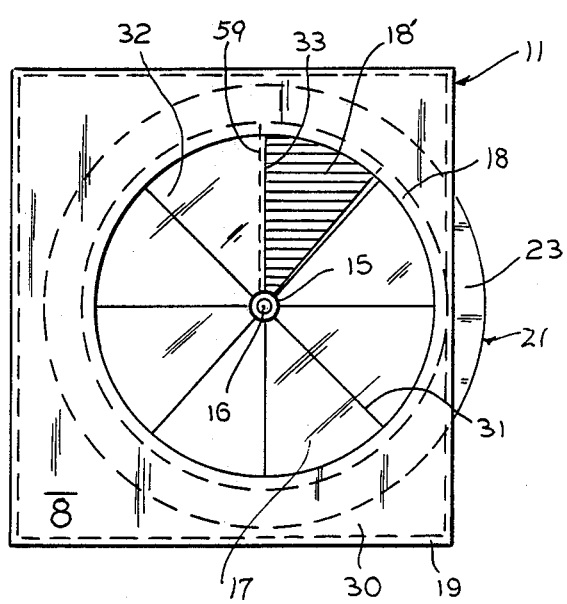
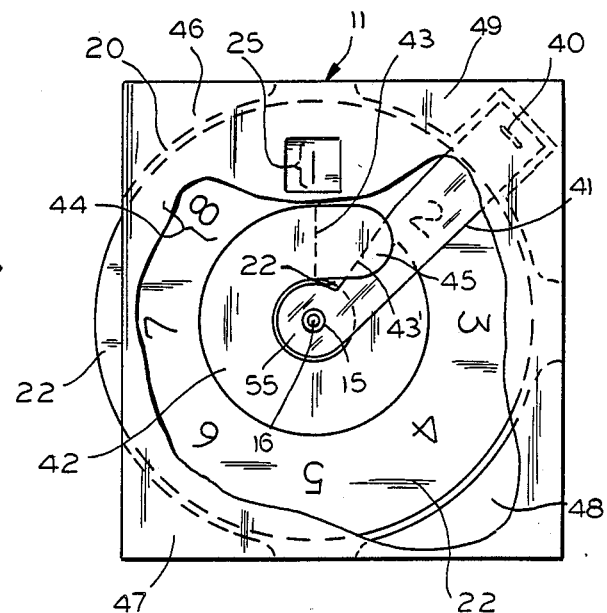
FIG.1
FIG.2
FIG.3
FIG.4

ROTATABLE DISK TEACHING APPARATUS

BACKGROUND OF THE INVENTION

The present invention relates in general to learning aids, and in particular, to a demonstrative teaching apparatus to be used as an aid in, for example, the teaching and understanding of mathematical fractions, as well as the disclosure of distances between geographical locations, among other things.

For decades, various means have been utilized to aid in the teaching of fractions through the use of numerical fractional equivalent representations. While several of such learning aids have typically utilized "pie-shaped" sections corresponding to the numerical fractional equivalent of a whole "pie," only a few such learning aids have adopted an external housing for their apparatus, a circular disk which can be rotated so as to change or alter the amount of displayed segments or indicia, as well as a helical element which is used to represent particular segments of the overall display. Among the prior art references relying upon and/or disclosing utilization of a circular disk for graphic representation are U.S. Pat. Nos. 1,161,381; 2,816,373; 2,949,681; 3,024,540; 3,544,768; 4,634,385; and Re 22,692. The Orth '540 and Caddy '373 references particularly disclose the approaches of the prior art in attempting to use a "deployable" segment mechanism. In spite of the developments in circular rotational learning aids, few if any prior art devices employ an apparatus construction that utilizes an isolated rear display window which reveals indicia corresponding to the segments occupied by the helical element viewable from the front display viewing area. Further, few, if any prior art devices reveal such an apparatus that has forward and rearward stop limiting mechanisms.

It is thus an object of the present invention to provide a demonstrative teaching apparatus incorporating an apparatus housing which provides front and rear viewing means, wherein the graphical display or "answer" depicted through the front viewing means, can be observed in its numerical form through the rear viewing means.

Another object of the present invention is to provide a demonstrative teaching apparatus in which the graphical and numerical displays can be easily altered by rotational means.

It is additionally an object of the present invention to provide forward and rearward stopping mechanisms for the rotational means.

Yet a further object of the present invention is to provide a demonstrative teaching apparatus which can be used to teach or disclose other "segmented relationships" besides fractional relationships, such as geographical distance charts, and/or recipe guides, by permitting exposure of the segments with different corresponding printed indicia—all in a device that is inexpensive to manufacture and assemble.

These and other objects of the invention will become apparent in light of the present specification and drawings.

SUMMARY OF THE INVENTION

The present invention comprises a demonstrative teaching apparatus for disclosing relationships between increasable and decreasable arcuate segments which can be seen on a first surface. Indicia corresponding to the increasable arcuate segments can be seen on a second surface which is opposite in position to the first surface, so as to enable the corresponding "answer" indicia to be hidden from the arcuate segment "inquiry." An apparatus housing cover has a front side which includes a viewing area through which the increasable arcuate segments located on the first surface, may be viewed, together with a rear side which also has a viewing area—through which the corresponding indicia located on the second surface, which is opposite to the first surface, may be viewed.

Circular disk means are operably positioned for rotation within the apparatus housing means with the first and second surfaces respectively positioned thereon. The circular disk means includes, helical disk means which is substantially concentric with the circular disk means and is operably attached thereto, for portraying the increasable arcuate segments. The helical disk means are attached to the circular disk means along the first surface which is aligned with the front side viewing means, proximate to the front side of the apparatus housing means. The circular disk means further includes, a plurality of the indicia which may be correspondingly displayed, through the rear viewing means on the second surface aligned with the rear side viewing means, proximate to the rear side of the apparatus housing means. These indicia correspond to values associated with the amount and the position of the increasable arcuate segments which are respectively disclosed through the front viewing means.

Slotted plate means are operably positioned between the helical disk means on the first surface of the circular disk means and the front side viewing means in the front side of the apparatus housing means, for operable contrasting disclosure of the increasable arcuate segments. The slotted plate means includes a helical disk slot means through which the outermost end of the helical disk means protrudes, in a juxtaposed fashion, to disclose the increasable arcuate segments of the helical disk means to the extent desired by a user. The remainder of the slotted plate means masks the remaining portions of the juxtaposed helical disk means and the circular disk means from view, through the front side viewing means. The disclosed arcuate segments of the helical disk means are extendably and retractably propelled through the disk slot means in the slotted plate means. This is done through the forward and rearward rotation, respectively, of the circular disk means, and in turn, the helical disk means which is operably attached to the circular disk means within the apparatus housing means. Circular disk rotation means are provided for enabling the forward and rearward tactile rotation of the circular disk means, as desired, by a user. In turn, the rotation enables variations in the amount and position of arcuate segments displayed through the front side viewing means of the apparatus housing means, simultaneous with corresponding variations of the indicia relating thereto, as displayed through the oppositely positioned rear side viewing means of the apparatus housing means.

In a preferred embodiment of the invention, the apparatus further comprises a substantially transparent front shield means which is operably affixed to the viewing means on the front side of the apparatus housing means. This substantially transparent front shield allows for the protective viewing and operation of the disclosed increasable arcuate segments manifested by the contrasting helical disk means.

In the preferred embodiment of the invention, the substantially transparent front shield means includes a plurality of radially extending indicia lines which are used to calibrate the position of the increasable arcuate segments.

The indicia lines or calibration means serve to divide the substantially transparent front shield means into designated segmented pie-shaped wedge portions. These portions may correspond, in one embodiment of the apparatus, to one of a plurality of fraction indicia which is displayed through the rear viewing means located on the back side of the apparatus housing. Accordingly, the demonstrative display apparatus may be utilized to convey and demonstrate circular fractional relationships.

In an alternative embodiment, the increasable segments displayed through the front viewing means cooperate with the calibration means and geographical notation positioned thereupon, to describe representational distances between geographical locations—where the corresponding indicia would respectively identify mileage between segments of geographical location. Alternatively, the present apparatus may be utilized to demonstrate or chart other segmented indicia relationships such as for recipes, volumes, and the like.

The demonstrative teaching apparatus also comprises a substantially transparent rear shield means operably positioned adjacent to the viewing means on the rear side of the apparatus housing means. This shield serves to protect the viewing, and the rotation of the various indicia which are located on the second surface of the circular disk.

In one embodiment of the invention, the rear viewing area, which is located on the rear side of the apparatus housing, further includes a rear shield cover member. This cover is slidably positioned to reciprocate between a closed covering position and an open revealing position over the viewing means located on the rear side of the apparatus housing. This cover then permits alternative obstruction and revealing of the indicia being displayed through the viewing means on the rear side of the apparatus housing. In this embodiment of the invention, the rear shield cover means also includes tab means which are operably attached to the rear shield cover means itself. The tab means serves to enable tactile reciprocation of the integrated rear shield cover-tab means assembly, between the closed and open positions of the cover.

The demonstrative teaching apparatus further employs a reverse rotation stopping means which serve to limit the extent to which the circular disk means, and the helical disk means may be reversably rotated. In the preferred embodiment, the reverse rotation stopping means consists of a stop tab means and a radially positioned stop arm means. The stop tab means has a first end which is operably secured to the second side of the circular disk means, and a second end which emanates angularly outwardly from the circular disk means. The radially positioned stop arm means also has a first and second end, with its first end being positioned next to the center of the second side of the circular disk means and emanating therefrom, and its second end operably affixed to the slotted plate means. Reverse rotation of the circular disk member is limited when the stop arm means abuts and engages the stop tab means. This limitation of reverse rotation precludes against the inadvertent unthreading of the helical disk means from within the slot means of the slotted disk means.

In this preferred embodiment, the demonstrative teaching apparatus also provides for forward rotation stopping means, which serve to limit the extent to which the circular disk means and helical disk means may be forwardly rotated. The forward rotation stopping means comprises an attachment region at the first fixed radially slit end of the helical disk means is attached to the circular disk means. The forward rotation stopping means will limit the forward rotation of the second, free radially slit end of the circular disk means when the fixed attachment region of the helical disk member is rotated into abutment with the edge of the helical disk slot means located on the slotted plate means.

In one embodiment of the invention, the apparatus housing means further comprises a housing slot which is positioned along one of the edges of the apparatus between the outer periphery of the rear and the front side of the apparatus housing itself. This slot enables at least a marginal portion of the circular disk means to protrude from the apparatus housing. Such exposure of the circular disk then enables the tactile, mechanical rotation thereof by a user of the invention.

Circular disk rotation of the circular and helical disk means is accommodated by a rotational pin member. This pin is operably positioned through the respective centers of the circular disk means and the helical disk means so as to allow for each of their operational rotation around the pin. In yet another embodiment of the invention, the circular disk rotation means comprises arched corner guides. These guides are operably positioned around the circular disk means so as to control and constrain the angular rotation of the circular disk means and, in turn, the helical disk means.

In the preferred embodiment, the invention contemplates that the helical disk means could be fabricated of a material which appears visually contrasting to the appearance of the slotted plate means. The contrasting appearance will then provide for an easily differentiable visual distinction between these elements, for easier viewing of the increasable and decreasable segments through the front viewing area.

BRIEF DESCRIPTION OF THE DRAWINGS

FIG. 1 of the drawings is an elevated front view of the demonstrative teaching apparatus showing, in particular, the increasable-decreasable arcuate segments within the calibration lines, as seen through the front viewing means;

FIG. 2 of the drawings is an elevated rear view of the demonstrative teaching apparatus showing the rear side of the apparatus housing cover, with one of a plurality of the numerical indicia positioned on the circular disk, as seen through the rear side viewing area;

FIG. 3 of the drawings is an elevated front view of the demonstrative teaching apparatus of FIG. 1, partially in phantom, particularly showing the entirety of the circular disk means, helical disk means and slotted plate means, as evidenced by said phantom lines;

FIG. 4 of the drawings is an elevated rear view of the demonstrative teaching apparatus of FIG. 2, in partial cut-away view, showing particularly the radial stop arm and stop tab means for limiting rotation of the circular disk means, as well as the position of the plurality of numerical indicia shown on the second surface of the circular disk means;

DETAILED DESCRIPTION OF THE DRAWINGS

Figure 5:
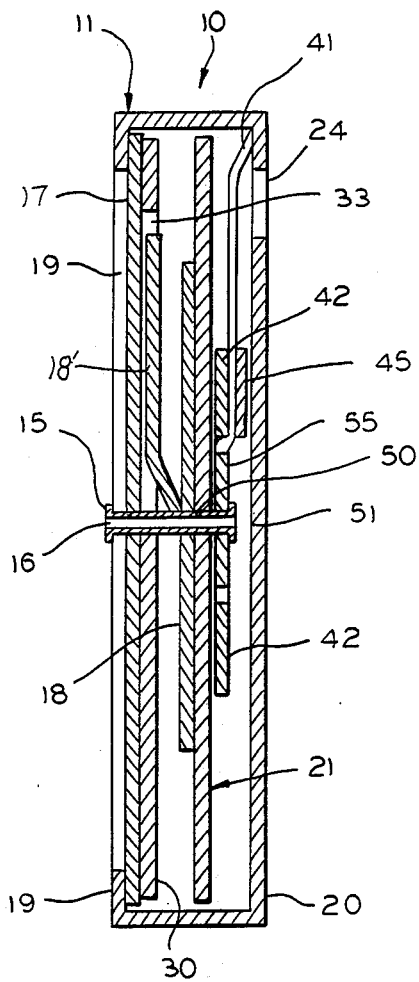
FIG. 5 of the drawings is an elevated cross-sectional side view taken along lines 5—5 of FIG. 1 and looking in the direction of the arrows, showing the structural and operable relationship of the housed elements.

While this invention is susceptible of embodiment in many different forms, there is shown in the drawing and will herein be described in detail, several specific embodiments with the understanding that the present disclosure is to be considered as an exemplification of the principles of the invention and is not intended to limit the invention to the embodiments illustrated.

Demonstrative teaching apparatus 10 is shown in FIG. 1 as including apparatus housing means 11 having front side 19, rear side 20, as well as front side viewing means 12, rear side viewing means 24 and transparent viewing shield 17. External notation 29 is located on front side 19 of apparatus housing 11, which, in this embodiment, corresponds to the number of superimposed radial calibration lines such as calibration lines 13 and 14 which appear superimposed in viewing means 12. Substantially transparent protective shield 17, also shown in FIG. 5, is enclosed within apparatus housing 11 in front of helical disk 18, exposed helical disk portion 18′ and slotted plate 30, and serve to protect and isolate slotted plate means 30 and increasable arcuate segment 18′ of helical disk means 18. Shown through front viewing means 17, in FIG. 1, is the exposed increasable arcuate, pie-shaped, means 18′ of helical disk 18, as it occupies one segment (of eight) between radially extended calibration lines such as lines 13 and 14. Increasable exposed arcuate segment 18′ is a portion of otherwise unexposed helical disk means 18 which emanates from first surface 23 of circular disk means 21. The extent to which segment 18′ is exposed can be increased or decreased depending upon rotation of circular disk 21 forwardly or rearwardly. Circular rotation of circular disk 21 is achieved through pivot pin housing 15, having a hollow opening 16, positioned through the center of circular disk 21 and helical disk 18.

Rear side 20 of apparatus housing cover 11 is shown in FIG. 2, in which second surface 22 of circular disk 21 bears a plurality of indicia, such as indicia 25. Each indicia corresponds to the position of the increasable arcuate segments 18′ being exposed through front viewing means 12. Rear viewing means 24 may thus be positioned above external notation 28, which notation corresponds to the number of calibration lines, such as lines 13 and 14, as shown in FIG. When circular disk 21 is forwardly or rearwardly rotated to affect the exposure of increasable arcuate segment 18′ within front viewing means 12, rear viewing means 24 reveals the specific corresponding indicia 25 from among the plurality of indicia positioned along the second side 22 of circular disk 21. In the fractional teaching apparatus embodiment of FIGS. 1 and 2, the indicia is shown as a numerator over the given denominator notation 28, where numerator indicia 25 corresponds to the actual area of viewing means 17 occupied by the exposed increasable arcuate segment 18′—as shown in FIG. 1.

In FIG. 3, radial slot 33 within slotted plate means 30, is shown with increasable arcuate segment portion 18′ therethrough to contrast with the remaining exposed surface 32 of slotted plate means 30. Radial slot 33 allows for further increase or decrease of exposed arcuate segment means 18′ upon forward or rearward rotation of circular disk 21, as shown in front viewing means 12 in front side 19 of apparatus housing 11. Rotational means 15 is shown in a centered position with respect to circular disk means 21, and first disk surface 23 of circular disk means 21, along with the remainder of masked helical disk means 18 and slotted plate means 30, can be seen in phantom view, from front side 19 of apparatus housing 11. Attached region 59 where helical disk 18 is affixed to circular disk 21, precludes against inadvertent over rotation of the circular disk in the forward direction when slot edge 33 abuts region 59 to stop or limit further rotation.

The partially rear cut-away view of FIG. 4 shows demonstrative teaching apparatus 10, and particularly, rear side 20 of apparatus housing cover 11. Stop arm 41 is shown with second end 40 operably secured to one corner of rear side 20 and first end 55 concentrically positioned around the rotational pin 15 with first end 55 further juxtaposed (but not attached so as to permit rotation therebetween) to second surface 22 of circular disk means 21. Arm portion 43′ of stop arm 41 prevents the circular disk 21 from being overly rotated in the reverse direction, which would otherwise unthread disk portion 18′ from within slot 33. Emanating stop tab 45 at connection 43, eventually abuts edge 43′ to halt such reverse rotation.

In addition to, or as an alternative to centering pin 15 providing rotation means for circular disk 21, arched centering curves 46, 49, 47, and 48 further provide rotational and centering capabilities for circular disk means 21. Specific numerical indicia, such as indicia, 25, are positioned on the second surface of circular disk 21. When increasable arcuate segment 18′ is in the position shown in FIG. 1, said numerical indicia 25 will, for example, reveal the indicia numeral 1, to convey the fractional concept of ⅛ "of the pie" being occupied by contrasting segment 18′.

Demonstrative teaching apparatus 10 is shown in cross section in FIG. 5. Centering pin 15, having aperture 16 and pin shaft 50, keeps the apertures of substantially transparent protection shield 17, slotted disk 30, circular disk 21 and helical disk 18 aligned with relation to the front side 19 of apparatus housing cover 11, while additionally providing rotational capabilities for circular disk 21 and helical disk 18. Exposed portion 18′ of helical disk 18 is shown received through radial slot 33 of slotted disk 30.

The first end of stop arm 41 is shown operably secured to inner side 51 of rear side 20 of apparatus housing cover 11. Stop arm 41 second end 55 is shown cooperating with and beneath stopping tab 45 and above circular stopping tab support means 42 as also shown in FIG. 4. Rear viewing means 24 along rear side 20 of apparatus housing cover 11 is also shown in FIG. 5.

Figure 6:
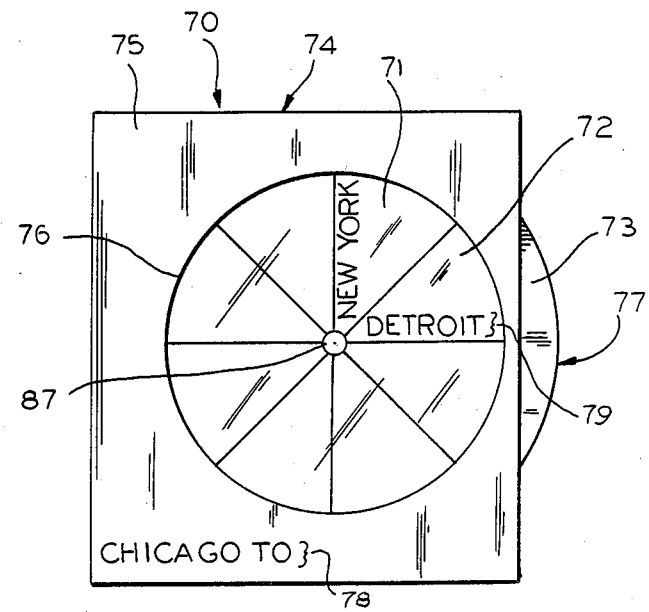
FIG. 6 of the drawings is an elevated front view of an embodiment of the demonstrative teaching apparatus in which mileage distances between specified geographic locations may be determined.
Figure 7:
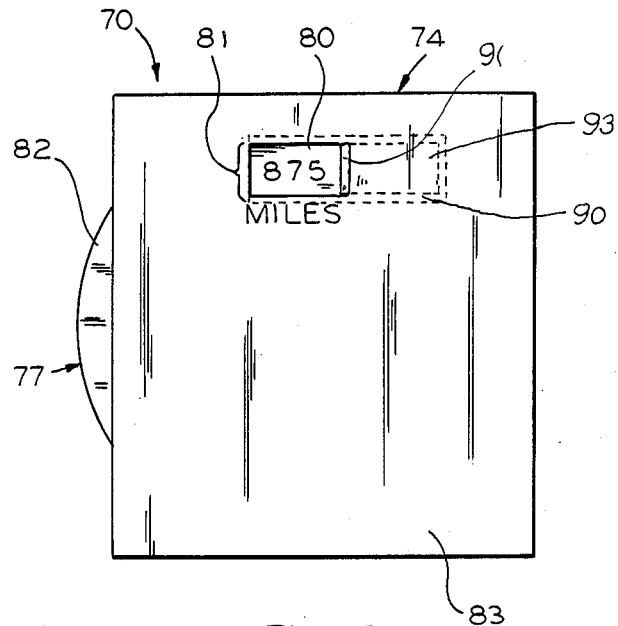
FIG. 7 of the drawings is an elevated rear view of the demonstrative apparatus of FIG. 6 showing corresponding mileage indicia responsive to the distances between geographical locations.

An embodiment of the invention used to display distances between two geographic locations is shown in FIG. 6 where demonstrative teaching apparatus 70 includes apparatus housing cover 74 having front side 75, with front surface 73 on circular disk 77. Circular disk 77 may be rotated around pivoting means 87 until the exposed portion of the helical disk (not shown) extends over segments 71 or 72 etc. Notation 79 represents a geographical location and other locations, such as location 78, between which the mileage may be determined by referring to the adjusted indicia on the reverse side. Indeed, FIG. 7 of the drawings shows numerical indicia 81 through viewing window 80 on rear side 83 of demonstrative teaching apparatus 70. Also shown in FIG. 7 is rear shield cover 93 with tab 91 in guide 90 for covering up viewing window 80, if desired, to further preclude access to the indicia "answer."

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A demonstrative teaching apparatus for disclosing relationships between variable pie-shaped segments on a first surface and indicia corresponding to same on a second surface opposite to said first surface, said apparatus comprising:

apparatus housing means having a front side with front side viewing means through which said variable pie-shaped segments on said first surface may be viewed, together with a rear side with rear side viewing means through which said corresponding indicia on said second surface opposite to said first surface may be viewed;

circular disk means operably positioned for rotation within said apparatus housing means and on which first and second surfaces are respectively positioned, said circular disk means including, on said first surface aligned with said front side viewing means, proximate to the front side of said apparatus housing means, helical disk means substantially concentric with said circular disk means and operably attached thereto, for portraying said variable pie-shaped segments, said circular disk means further including, on said second surface aligned with said rear side viewing means, proximate to the rear side of said apparatus housing means, a plurality of said indicia correspondingly displaying, through said rear viewing means, values associated with the amount and position of said variable pie-shaped segments disclosed through said front viewing means;

slotted plate means operably positioned between said helical disk means on said first surface of said circular disk means and, said front side viewing means in said front side of said apparatus housing means, for operable disclosure of said variable pie-shaped segments, said slotted plate means including helical disk slot means through which the outermost free end of said helical disk means protrudes in juxtaposed fashion to disclose, as desired, said variable pie-shaped segments advanced by said helical disk means, while said slotted plate means masks the remainder of said juxtaposed helical disk means and said circular disk means from view through said front side viewing means, said disclosed variable pie-shaped segments of said helical disk means being extendably and retractably propelled through said helical disk slot means in said slotted plate means, through the forward and rearward rotation, respectively, of said circular disk means, and in turn, said helical disk means which are operably attached to said circular disk means within said apparatus housing means;

circular disk rotation means for enabling said forward and rearward rotation of said circular disk means, as desired, by a user to, in turn, enable variations in the amount and position of said disclosed variable pie-shaped segments displayed through said front side viewing means of said apparatus housing means, simultaneous with the disclosure of said indicia corresponding thereto, as displayed through said rear side viewing means of said apparatus housing means;

said invention further comprising reverse rotation stopping means for limiting the extent to which said circular disk means and, in turn, said helical disk means may be reversably rotated;

said reverse rotation stopping means comprising stop tab means having a first end operably secured to said second side of said circular disk means and a second end emanating angularly outwardly therefrom, and radially positioned stop arm means having a first end operably juxtaposed to and emanating from the center of the second side of said circular disk means and a second end operably affixed to said slotted plate means, said stop arm means engaging said stop tab means to limit the reverse rotation of said circular disk means to preclude against the inadvertent unthreading of said helical disk means from within said helical disk slot means in said slotted disk means.

2. The demonstrative teaching apparatus according to claim 1 wherein the invention further comprises substantially transparent front shield means operably affixed to said front side viewing means for protective viewing and operation of said disclosed variable pie-shaped segments of said helical disk means.

3. The invention according to claim 2 wherein said substantially transparent front shield means includes a plurality of radially extending indicia line means for calibrating the position of said variable pie-shaped segments.

4. The invention according to claim 3 wherein said indicia line means divides said substantially transparent front shield means into segmented pie-shaped portions, each portion mathematically corresponding to one of a plurality of numerical fraction indicia displayed through said rear viewing means whereby said demonstrative display apparatus may be utilized to convey and demonstrate fractional relationships.

5. The invention according to claim 3 wherein said indicia line means divides said substantially transparent front shield means into segmented pie-shaped portions, each portion geographically corresponding to one of a plurality of numerical mileage indicia displayed through said rear viewing means for conveying numerical distances between two geographic locations, said indicia line means including geographical notation displayed thereupon for viewing relative to said variable pie-shaped segment means, which notation corresponds to numerical distances displayed through said rear viewing means.

6. The demonstrative teaching apparatus according to claim 10 wherein the invention further comprises substantially transparent rear shield means operably positioned adjacent to said rear side viewing means of said housing means for protective viewing means means of said indicia on said second surface of said circular disk.

7. The invention according to claim 6 wherein said rear side viewing means includes rear shield cover means; said rear shield cover means being slidably positionable to reciprocate between a closed covering position and an open revealing position over said rear side viewing means to alternatively obstruct and reveal the indicia being displayed through said rear side viewing means.

8. The invention according to claim 7 wherein said rear shield cover means includes tab means operably attached to said rear shield cover means, to enable tactile reciprocation of same between said closed and open positions.

9. The demonstrative teaching apparatus according to claim 1 wherein said invention further comprises forward rotation stopping means for limiting the extent to which said circular disk means and, in turn, said helical disk means may be forwardly rotated.

10. The demonstrative teaching apparatus according to claim 1 wherein the invention further comprises housing slot means positioned along one edge of the apparatus between the outer periphery of said rear and front sides of said apparatus housing means,
said housing slot means enabling the protrusion of a marginal portion of said circular disk means from said apparatus housing means, to, in turn, enable the tactile mechanical rotation of said circular disk means by said user.

11. The invention according to claim 1 wherein said circular disk rotation means comprises a rotational pin member operably positioned through the respective centers of said circular disk means and said helical disk means for operational rotation around same.

12. The invention according to claim 1 wherein said circular disk rotation means comprises arched corner guides operably positioned about said circular disk means for controlling the angular rotation of said circular disk means and, in turn, said helical disk means.

13. The invention according to claim 1 wherein said helical disk means comprises a material bearing an appearance visually contrasting with the appearance of said slotted plate means thereby providing an easily differentiable visual distinction therebetween.

14. A demonstrative teaching apparatus for disclosing relationships between variable pie-shaped segments on a first surface and indicia corresponding to same on a second surface opposite to said first surface, said apparatus comprising:
apparatus housing means having a front side with front side viewing means through which said variable pie-shaped segments on said first surface may be viewed, together with a rear side with rear side viewing means through which said corresponding indicia on said second surface opposite to said first surface may be viewed;
circular disk means operably positioned for rotation within said apparatus housing means and on which first and second surfaces are respectively positioned,
said circular disk means including, on said first surface aligned with said front side viewing means, proximate to the front side of said apparatus housing means, helical disk means substantially concentric with said circular disk means and operably attached thereto, for portraying said variable pie-shaped segments,
said circular disk means further including, on said second surface aligned with said rear side viewing means, proximate to the rear side of said apparatus housing means, a plurality of said indicia correspondingly displaying, through said rear viewing means, values associated with the amount and position of said variable pie-shaped segments disclosed through said front viewing means;
slotted plate means operably positioned between said helical disk means on said first surface of said circular disk means and, said front side viewing means in said front side of said apparatus housing means, for operable disclosure of said variable pie-shaped segments,
said slotted plate means including helical disk slot means through which the outermost free end of said helical disk means protrudes in juxtaposed fashion to disclose, as desired, said variable pie-shaped segments advanced by said helical disk means, while said slotted plate means masks the remainder of said juxtaposed helical disk means and said circular disk means from view through said front side viewing means,
said disclosed variable pie-shaped segments of said helical disk means being extendably and retractably propelled through said helical disk slot means in said slotted plate means, through the forward and rearward rotation, respectively, of said circular disk means, and in turn, said helical disk means which are operably attached to said circular disk means within said apparatus housing means;
circular disk rotation means for enabling said forward and rearward rotation of said circular disk means, as desired, by a user to, in turn, enable variations in the amount and position of said disclosed variable pie-shaped segments displayed through said front side viewing means of said apparatus housing means, simultaneous with the disclosure of said indicia corresponding thereto, as displayed through said rear side viewing means of said apparatus housing means;
said invention further comprising forward rotation stopping means for limiting the extent to which said circular disk means and, in turn, said helical disk means may be forwardly rotated;
said forward rotation stopping means comprising a region of fixed attachment operably securing one end of said helical disk means on and to said circular disk means, to limit forward rotation of the free end of said circular disk means therepast,
said forward rotation stopping means serving to preclude any additional forward rotation of said circular disk means and, in turn, said helical disk means, when said fixed attachment region is rotated into abutment with said helical disk slot means of said slotted plate means.

15. The demonstrative teaching apparatus according to claim 14 wherein the invention further comprises substantially transparent front shield means operably affixed to said front side viewing means for protective viewing and operation of said disclosed variable pie-shaped segments of said helical disk means.

16. The invention according to claim 15 wherein said substantially transparent front shield means includes a plurality of radially extending indicia line means for calibrating the position of said variable pie-shaped segments.

17. The invention according to claim 16 wherein said indicia line means divides said substantially transparent front shield means into segmented pie-shaped portions, each portion mathematically corresponding to one of a plurality of numerical fraction indicia displayed through said rear viewing means whereby said demonstrative display apparatus may be utilized to convey and demonstrate fractional relationships.

18. The invention according to claim 16 wherein said indicia line means divides said substantially transparent front shield means into segmented pie-shaped portions, each portion geographically corresponding to one of a plurality of numerical mileage indicia displayed through said rear viewing means for conveying numerical distances between two geographic locations,
    said indicia line means including geographical notation displayed thereupon for viewing relative to said variable pie-shaped segment means, which notation corresponds to numerical distances displayed through said rear viewing means.

19. The demonstrative teaching apparatus according to claim 14 wherein the invention further comprises substantially transparent rear shield means operably positioned adjacent to said rear side viewing means of said housing means for protective viewing of said indicia on said second surface of said circular disk.

20. The invention according to claim 19 wherein said rear side viewing means includes rear shield cover means;
    said rear shield cover means being slidably positionable to reciprocate between a closed covering position and an open revealing position over said rear side viewing means to alternatively obstruct and reveal the indicia being displayed through said rear side viewing means.

21. The invention according to claim 20 wherein said rear shield cover means includes tab means operably attached to said rear shield cover means, to enable tactile reciprocation of same between said closed and open positions.

22. The demonstrative teaching apparatus according to claim 14 wherein said invention further comprises reverse rotation stopping means for limiting the extent to which said circular disk means and, in turn, said helical disk means may be reversably rotated.

23. The demonstrative teaching apparatus according to claim 14 wherein the invention further comprises housing slot means positioned along one edge of the apparatus between the outer periphery of said rear and front sides of said apparatus housing means,
    said housing slot means enabling the protrusion of a marginal portion of said circular disk means from said apparatus housing means, to, in turn, enable the tactile mechanical rotation of said circular disk means by said user.

24. The invention according to claim 14 wherein said circular disk rotation means comprises a rotational pin member operably positioned through the respective centers of said circular disk means and said helical disk means for operational rotation around same.

25. The invention according to claim 14 wherein said circular disk rotation means comprises arched corner guides operably positioned about said circular disk means for controlling the angular rotation of said circular disk means and, in turn, said helical disk means.

26. The invention according to claim 14 wherein said helical disk means comprises a material bearing an appearance visually contrasting with the appearance of said slotted plate means thereby providing an easily differentiable visual distinction therebetween.

* * * * *

UNITED STATES PATENT AND TRADEMARK OFFICE
CERTIFICATE OF CORRECTION

PATENT NO.  : 4,920,033
DATED       : April 24, 1990
INVENTOR(S) : Cress

It is certified that error appears in the above-identified patent and that said Letters Patent is hereby corrected as shown below:

| | |
|---|---|
| Col. 4, line 6 | After "attachment region at" insert -- which -- |
| Col. 5, line 37 | After "pie-shaped," insert -- segment -- |
| Col. 5, line 57 | After "FIG." insert -- 1. -- |
| Col. 6, line 2 | After "18'" insert -- threaded -- |
| Col. 8, line 67 | After "claim" delete "10" and insert -- 1 -- instead |

UNITED STATES PATENT AND TRADEMARK OFFICE
CERTIFICATE OF CORRECTION

PATENT NO. : 4,920,033

DATED : April 24, 1990

INVENTOR(S) : Cress

It is certified that error appears in the above-identified patent and that said Letters Patent is hereby corrected as shown below:

Col. 9, line 2, after "viewing" delete "means means"

Signed and Sealed this

Twenty-second Day of February, 1994

Attest:

BRUCE LEHMAN

Attesting Officer

Commissioner of Patents and Trademarks